US006880543B2

(12) United States Patent
Bradfield (10) Patent No.: US 6,880,543 B2
(45) Date of Patent: Apr. 19, 2005

(54) TILE CUTTER

(75) Inventor: Iain Bradfield, Norwich (GB)

(73) Assignee: Turner Intellectual Property Limited (GB)

( * ) Notice: Subject to any disclaimer, the term of this patent is extended or adjusted under 35 U.S.C. 154(b) by 0 days.

(21) Appl. No.: 10/214,907

(22) Filed: Aug. 8, 2002

(65) Prior Publication Data

US 2003/0051720 A1 Mar. 20, 2003

(30) Foreign Application Priority Data

Aug. 11, 2001 (GB) .............................................. 0119680

(51) Int. Cl.[7] .............................................. B28D 1/02
(52) U.S. Cl. ..................................... 125/12; 125/13.01
(58) Field of Search ............................... 125/12, 13.01, 125/15, 18, 23.01; 83/485, 487, 862–865

(56) References Cited

U.S. PATENT DOCUMENTS 4,976,251 A * 12/1990 Smith ....................... 125/13.01
6,112,785 A *  9/2000 Yu ............................. 144/287

FOREIGN PATENT DOCUMENTS

| EP | 2 134 424   | 1/1983  |
| EP | 0 589 796 A | 9/1993  |
| EP | 2 303 820   | 7/1996  |
| EP | 2 323 480   | 11/1998 |
| EP | 1 057 564 A | 5/2000  |

* cited by examiner

Primary Examiner—Lee D. Wilson
(74) Attorney, Agent, or Firm—Nikolai & Mersereau, PA; C. G. Mersereau (57) ABSTRACT

A tile cutter includes a cutting wheel, a motor which drives the wheel in use, and a main housing body and a worktop mounted on the main housing body to define a cutting surface upon which tiles may be supported when being cut. The main housing body includes a first compartment for housing the motor and a second compartment for housing the cutting wheel. The second compartment defines an open topped water compartment. The worktop has a main body fixedly secured to the main housing body and has an access opening closed by a movable access lid overlying the second compartment to close the open top of the water compartment. The access lid provides access to the water compartment. The worktop further includes one or more open topped drainage channels communicating with the cutting surface and the water compartment to permit, in use, water to drain from the cutting surface to the water compartment.

14 Claims, 13 Drawing Sheets

TILE CUTTER

BACKGROUND OF THE INVENTION

1. Field of the Invention

This invention relates to a tile cutter, and particularly, but not exclusively to a tile cutter for cutting ceramic tiles of the type used to cover walls and floors.

2. Related Art

It is known to cut tiles using a wheel which acts as a cutter in a similar way to a circular saw. The wheel is mounted in a housing on a spindle which allows the wheel to rotate about a substantially horizontal axis. The wheel is driven by a motor. The housing also houses the motor such that the motor is separate from the wheel. This is necessary because during operation of the wheel, water is directed onto the wheel in order to ensure that the tile is cut under wet conditions. Clearly it would be dangerous to allow the motor to come into contact with water.

It is necessary to ensure that the cutting wheel is wet during operation so that fragments of ceramic from the cut tile are removed from the vicinity of the wheel. In addition the water cools the wheel during operation to prevent it from overheating.

The known housing has an upper surface having a slot through which the wheel extends. A tile to be cut may be positioned appropriately on the surface, and then moved towards the rotating wheel to effect the cut.

Water directed onto the wheel collects on the surface of the housing. The surface of the housing comprises a drainage channel running around the periphery of the surface. In addition the surface may comprise ribbing which allows water to drain into the channel. Water then drains away from the housing via an outlet.

Known tile cutters of this type are made from metal, usually stainless steel. They are formed from sheet metal and it is necessary to weld the metal to form it into the required shape.

A problem with known tile cutters is that because they are formed from sheet metal, there are rough surfaces formed from the welding process. In addition, the upper surface including the drainage channel is formed with ribs which are necessary in order to strengthen the housing. Water draining from the housing during the cutting operation will contain fragments of ceramic from the tile being cut. These fragments of ceramic collect at the ribs and other rough surfaces of the housing making it difficult to clean the housing after use.

SUMMARY OF THE INVENTION

According to a first aspect of the present invention there is provided a tile cutter comprising a cutting wheel;

a motor which drives the wheel in use;

a main housing body and a worktop mounted on the main housing body to define a cutting surface upon which tiles may be supported when being cut;

the main housing body comprising a first compartment for housing the motor; and a second compartment for housing the cutting wheel, the second compartment defining an open topped water compartment, the worktop having a main body fixedly secured to the main housing body and having an access opening closed by a movable access lid overlying the second compartment to close the open top of the water compartment, the access lid providing access to the water compartment, the worktop further including one or more open topped drainage channels communicating with the cutting surface and the water compartment to permit, in use, water to drain from the cutting surface to the water compartment.

According to a second aspect of the present invention there is provided a housing forming part of the tile cutter of the first aspect of the present invention.

By forming the first compartment separately from the other components of the tile cutter, the motor may be easily removed for maintenance purposes. In addition, if it is required to clean the other components after use, the motor may be detached from the remainder of the housing thus ensuring that the motor will not come into contact unnecessarily with water.

Advantageously, the cutting surface is formed from a die cast metal. This means that it may be moulded into any desired shape without having to use welding or other techniques which result in ribbing and rough surfaces being formed on the surface. The cutting surface may therefore comprise a drainage channel extending around the surface, and drainage ribbing running along the surface for directing water to the drainage channel.

Alternatively, the cutting surface may be made from a plastics material, and formed into the desired shape through injection moulding.

The tile cutter of the present invention thus has fewer, if any unnecessary protrusions or rough surfaces on the cutting surface. This results in more efficient drainage of water during use of the tile cutter. It is also easier to clean the housing after use.

In addition to housing the cutting wheel, the second compartment also contains water to be used during operation of the tile cutter. The compartment is filled with water prior to operating the tile cutter. During use, rotation of the cutting wheel causes water to cover the wheel and to be transferred to the cutting surface of the housing. The water then drains back into the compartment via the drainage channels of the housing and is thus recycled for further use.

Advantageously, the second compartment comprises an outlet formed in the base of the compartment, and a plug sealingly fittable in the outlet. During use, the plug forms a seal in the outlet, and water may be poured into the compartment for use during operation of the tile cutter. After use, water may be removed from the compartment by removing the plug from the outlet.

By means of the present invention, it is possible therefore to empty the compartment without having to tip up or overturn the housing. This results in a simpler and safer emptying procedure.

Preferably, the plug is in the form of an elongate member. When the plug is in place in the outlet, it extends from the outlet into the compartment. The plug comprises a bore extending along its length. This means that when the plug is in place, if water is poured into the compartment to a depth greater than the length of the plug extending from the outlet, water will drain out of the compartment via the bore. The plug is shaped such that the length of the plug extending from the outlet into the compartment ensures that it is not possible to overfill the compartment.

Advantageously, the cutting surface comprises a mitre portion which is moveable relative to the remainder of the cutting surface. The mitre portion may be moved to a position in which it lies substantially at an angle of 45 degrees to the remainder of the cutting surface. By lying a tile on the mitre surface it is possible to cut a mitre along an edge of the tile.

Conveniently, the tile cutter further comprises a guide bar extending across the cutting surface substantially parallel to the cutting wheel, and moveable along the cutting edge. The guide bar is used to position a tile appropriately relative to the cutting wheel to enable the tile to be cut along a predetermined line.

Once the guide bar has been moved to an appropriate position, it is clamped onto the cutting surface of the housing in order to prevent further movement of the guide bar. The tile to be cut is positioned so that one side of the tile abuts the guide bar. The tile is then moved towards the cutting wheel whilst keeping the one side of the tile in contact with the guide bar to ensure that a substantially rectilinear cut is produced.

Preferably, the housing comprises a channel formed in the underside of the housing which channel is shaped to receive a guide member.

This means that when the product is stacked at a wholesale or retail outlet, a first tile cutter may be placed on top of a second tile cutter such that the guide member of the second tile cutter is received within the channel of the first guide member.

This enables a stack of tile cutters to be formed and enables the product to be displayed without the need for packaging. This allows potential buyers to properly view and feel the product before buying.

Advantageously, the channel comprises studs extending from a first surface of the channel, and the guide member comprises corresponding bores positioned to receive the studs when a first tile cutter is stacked on top of a second tile cutter with the channel of the first tile cutter receiving the guide member of the second channel cutter. This allows a plurality of tile cutters to be securely stacked and easily removed from a stack if required.

The channel may be formed in either the first compartment or the second compartment.

Advantageously the tile cutter further comprises a wheel guard positioned over the wheel to prevent injury to a user from the wheel. The wheel guard additionally prevents water from splashing or spraying onto the user during use.

BRIEF DESCRIPTION OF THE DRAWING

The invention will now be further described by way of example only with reference to the accompanying drawings in which.

DETAILED DESCRIPTION

Figure 1:
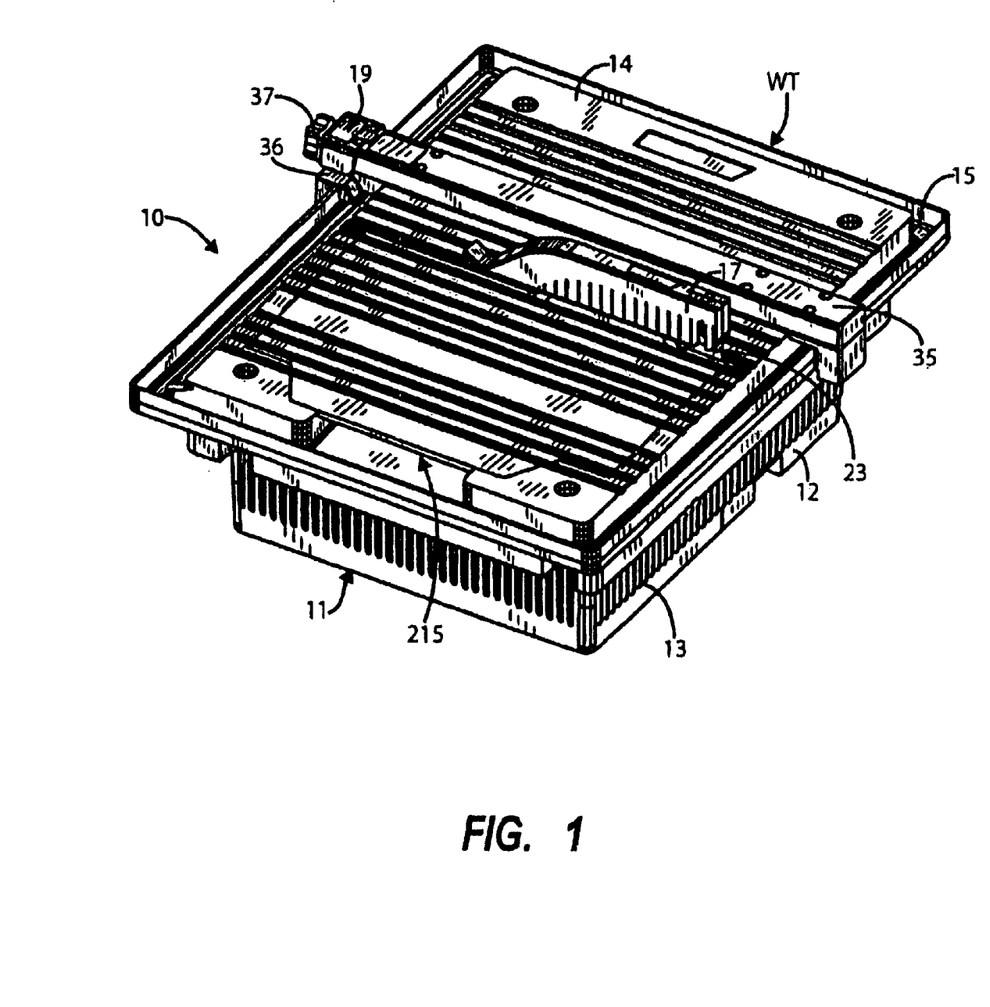
FIG. 1 is a schematic representation of a tile cutter according to a first embodiment of the present invention.
Figure 9:
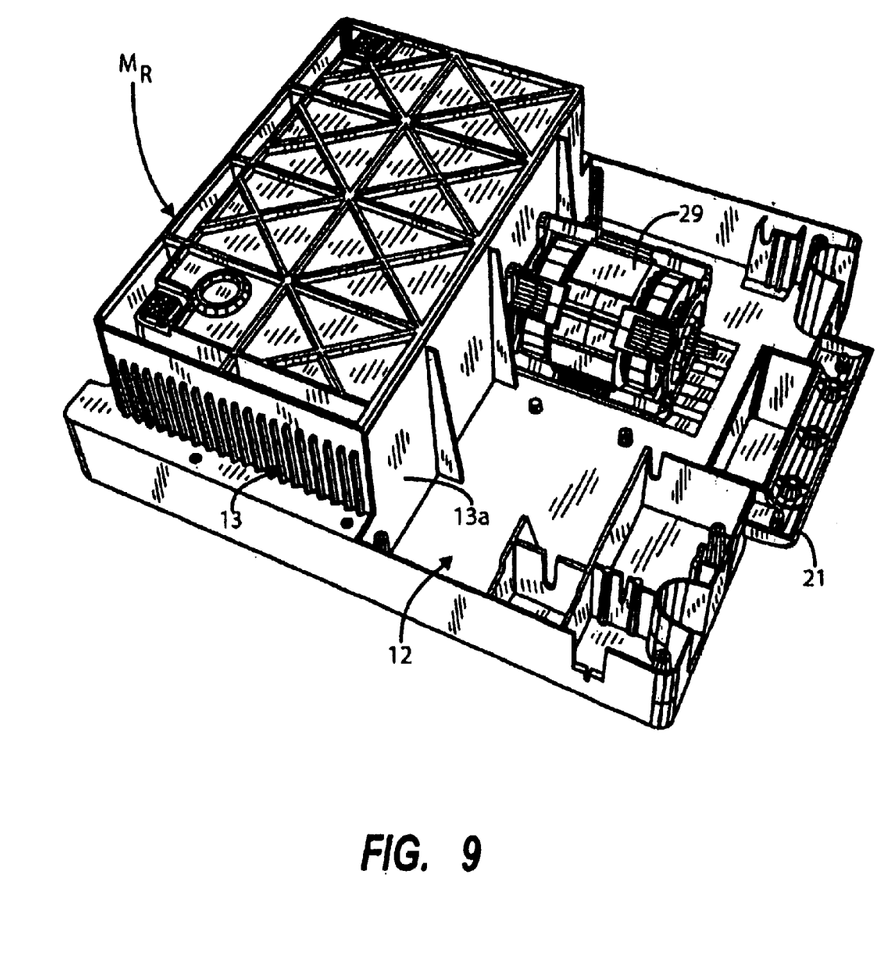
FIG. 9 is a schematic representation of the tile cutter as shown in FIG. 8 in which a housing body component is removed to show the position of the motor.

Referring to FIG. 1 a tile cutter according to an embodiment of the present invention is designated generally by the reference numeral 10. The tile cutter comprises a housing 11 comprising a first compartment 12 for housing a motor (as shown in FIG. 9), and a second compartment 13 for housing the wheel cutter (shown in more detail in FIG. 5). The second compartment 13 also defines an open topped water compartment for holding water which is required during the operation of the tile cutter.

Figure 2:
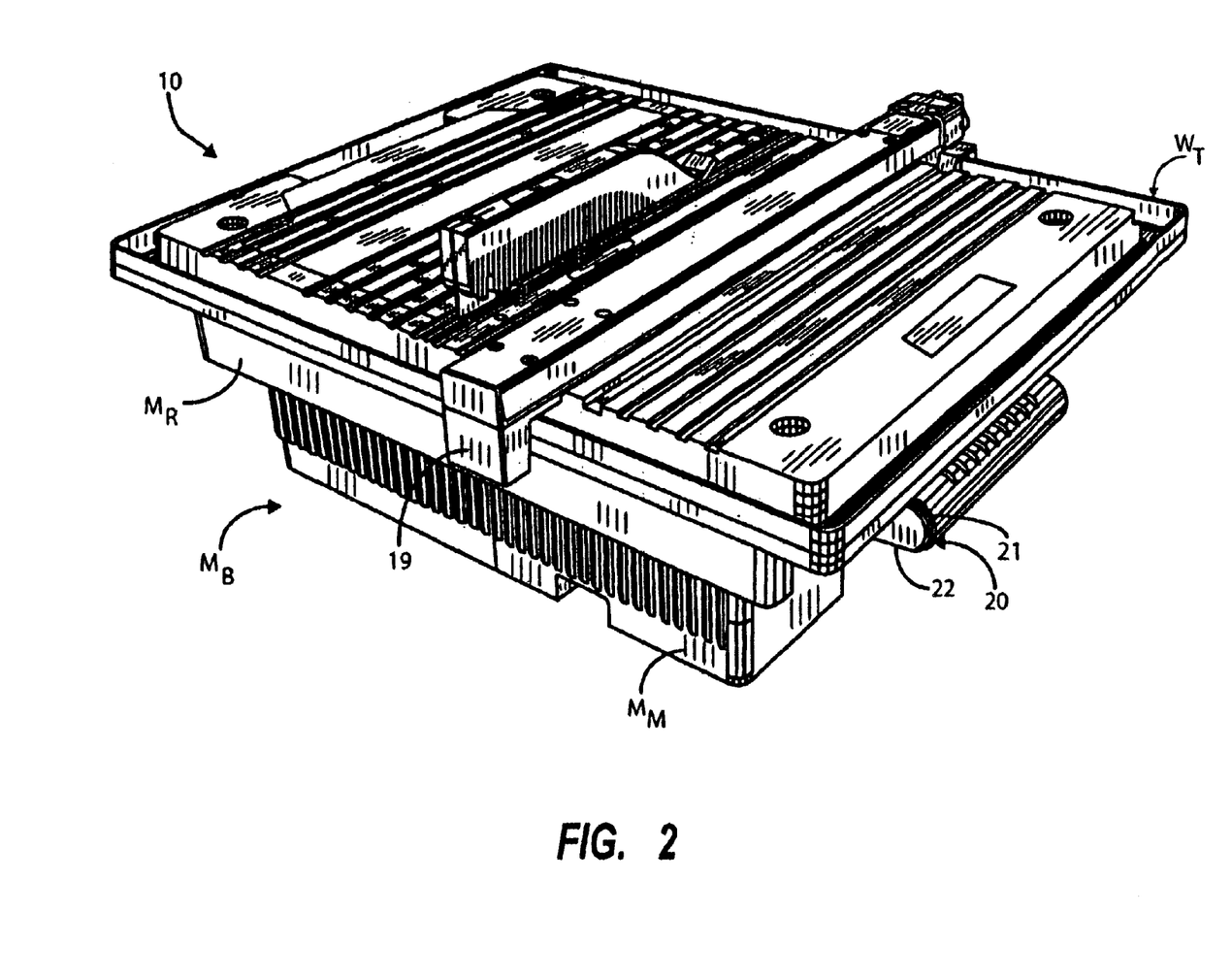
FIG. 2 is a schematic representation of the tile cutter of FIG. 1 showing the handle of the tile cutter.
Figure 4:
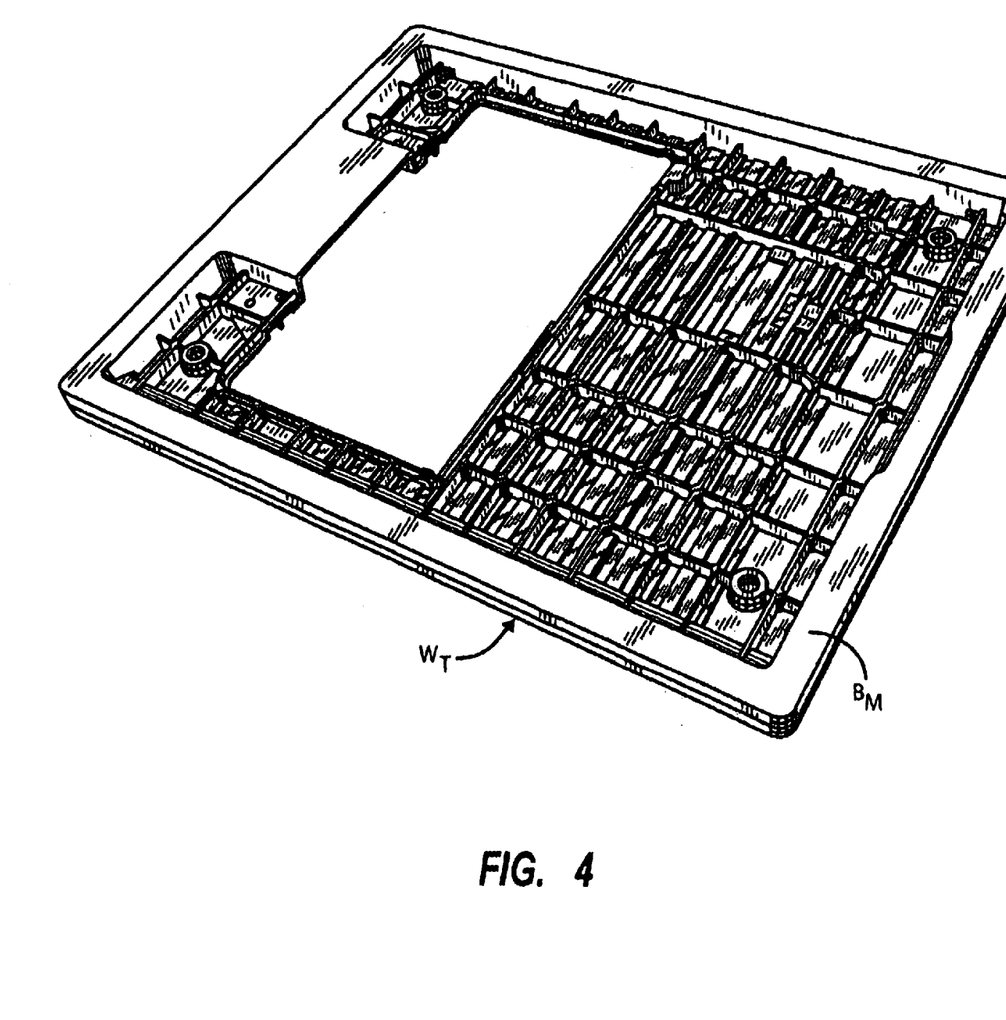
FIG. 4 is an underside view of the worktop defining the cutting surface shown in FIG. 1.
Figure 5:
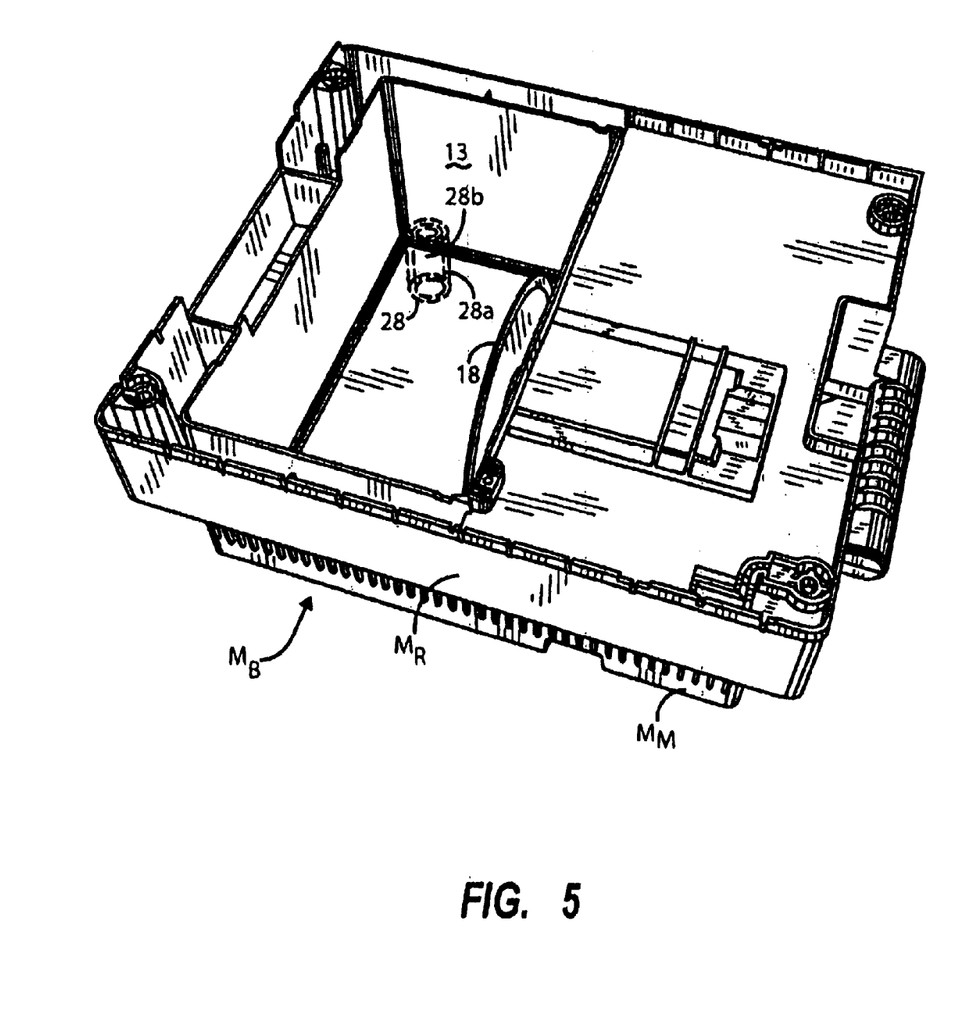
FIG. 5 is a schematic representation showing the housing with the worktop removed.

Referring to FIGS. 4, 5 and 9 it will be seen that the housing 11 includes a main body $M_B$ to which a worktop $W_T$ is attached; the top $W_T$ overlying the entire top of the main body $M_B$. The main body $M_B$ is preferably made from two body components, viz. a main body component $M_R$ and a minor body component $M_M$. The minor body component $M_M$ defines a lower half of the first compartment 12 and the remainder of the main body $M_B$ is defined by the main body component $M_R$. FIG. 9 shows the underside of the main body component $M_R$ and, as seen, component $M_R$ is preferably formed as a one-piece component which is preferably moulded from a plastics material. This is advantageous as it obviates the need to provide sealing joints between the dividing side walls between compartments 12, 13 and provides a totally sealed top for the first compartment 12. Minor component $M_M$, when removed, provides easy access to the motor 29. Preferably the component $M_M$ is a single piece plastics moulding. It will be seen from FIGS. 2 and 9 that the tile cutter further comprises a handle 20 which enables a user to conveniently carry the tile cutter 10 when the tile cutter is not required to be used. The handle 20 is formed from an upper portion 21 and a lower portion 22. The upper portion 21 is formed as part of the main body component $M_R$ and the lower portion 22 is formed as part of the minor body component $M_M$.

The worktop $W_T$ is secured to the main body $M_B$ to define the top of the tile cutter 10. The upper surface of the worktop $W_T$ defines a cutting surface 14 upon which tiles are placed for cutting.

The top $W_T$ overlies the water compartment defined by the second compartment 13 and so, in effect, defines a closure lid for the water component.

Figure 3:
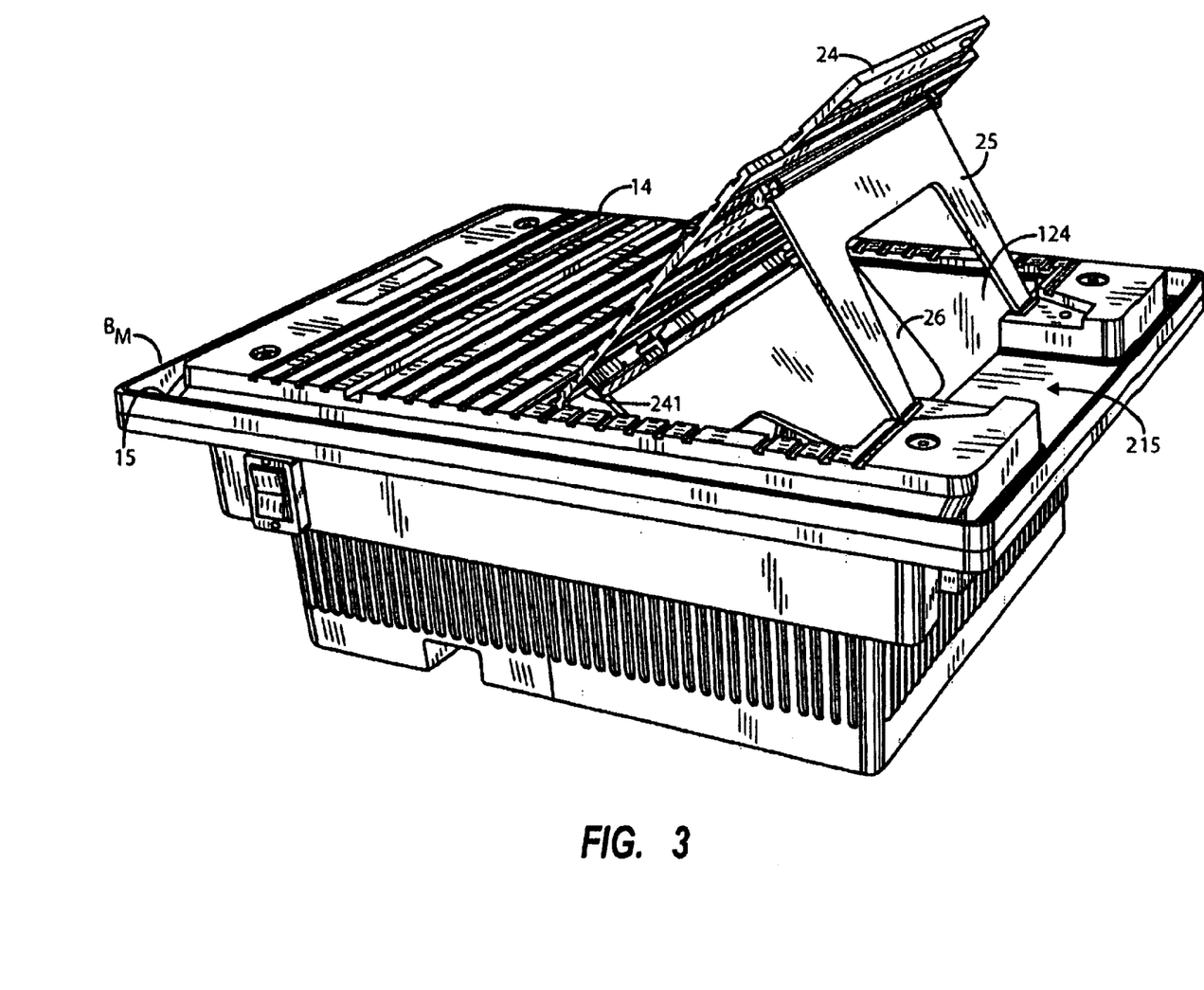
FIG. 3 is a schematic representation of the tile cutter of FIG. 1 showing the mitre portion in an extended position.

As seen in FIGS. 1, 3 and 4, the worktop $W_T$ has a main body $B_M$ which is a single piece and which is preferably formed as a casting from a suitable metal or as a moulding from a suitable plastics material.

The main body $B_M$ includes an integral open topped drainage channel 15 which extends about the periphery of the worktop $W_T$. Preferably the drainage channel 15 extends about the entire periphery of the top $W_T$ although it is envisaged that it may extend partially around its periphery, e.g. along one or two sides only.

The main body $B_M$ also includes a drainage outlet channel 215 which extends inwardly of the top $W_T$. The outlet channel 215 communicates with drainage channel 15 and the water compartment to thereby enable water collected by channel 15 to drain into the water compartment.

To enable the channel 215 to extend inwardly without restricting the working area of cutting surface 14 and adversely affecting functioning of the top $W_T$ as a closure lid for the water compartment, the channel 215 has a closed top defined by a movable access lid 24.

The lid 24 is located in an aperture 124 formed in the main body $B_M$ and is preferably cast or moulded from the same material as body $B_M$. Raising of lid 24 provides access to the water compartment for filling with water and also cleaning.

The provision of the access lid 24 enables the main body $B_M$ of the worktop $W_T$ to be fixedly secured to the main body $M_B$ of the housing whilst providing access to an internally contained water compartment.

Preferably the access lid 24 is adapted to define a mitre guide for cutting mitres along an edge of a tile. This is achieved by hingedly connecting the lid 24 along side edge 241 such that the hinge axis is located closely spaced and parallel to the plane of the cutting wheel and providing the lid 24 with legs 25 for maintaining the lid 24 at a desired angle relative to the remainder of the cutting surface.

Preferably the desired angle is 45°. It is envisaged that the legs 25 may be adjustable such that the angle of the lid 24 relative to the cutting surface 14 may be adjusted to any desired angle.

Preferably the lid 24 is also provided with a flap 26 which defines a splash guard whilst the tile cutter is operated with the lid 24 in its raised position.

The tile cutter further comprises a guard 17 positioned over the wheel cutter 18 to prevent a user of the tile cutter 10 from being injured by the wheel cutter or from being sprayed or splashed by water.

The tile cutter 10 further comprises a guide member 19 which is movably attached to the worktop $W_T$. When it is required to cut a tile having particular dimensions, a side of the tile is pushed into contact with the guide member, and the tile is then pushed forward into the cutting wheel 18 whilst maintaining close contact between the guide member 19 and the tile (not shown). This ensures that a substantially rectilinear cut is effected.

The guide member 19 is moved to an appropriate position such that when the tile to be cut is pressed against the guide member 19, the cut will be positioned as required.

The guide member 19 may be clamped to the worktop $W_T$ by means of clamp 36 which when tightened onto housing 11 holds the guide member 19 in place. The clamp is tightened and released as appropriate using knob 37.

The wheel guard 17 comprises an elongate portion 23 which serves to reduce the amount of water splashing or spraying in the direction of the user.

Turning now to FIG. 5, the cutting wheel 18 is shown in more detail. The cutting wheel is a conventional diamond cutter in which the cutting edge of the wheel is formed from a diamond matrix. The wheel 18 is mounted for rotation and is positioned within the second compartment 13 which also contains the water necessary during the operation of the tile cutter 10. The wheel 18 is connected to a motor 29 (shown in more detail in FIG. 9). As can be seen from FIG. 9, the motor is contained within compartment 12 and is thus kept away from the water held within compartment 13. It is only necessary to provide a shaft seal (not shown) where the motor shaft passess through the side wall 13a which separates compartments 12, 13 in order to sealingly isolate compartments 12, 13.

Referring now to FIG. 5, an outlet 28 formed in the second compartment 13 is shown. The outlet 28 allows water to be removed from the housing 11 after use of the tile cutter 10. During use of the tile cutter a plug 28A in the form of an elongate plug is sealingly engaged with the outlet 28. The plug 28a has a bore 28b running along its length and is chosen to have a length which is consistent with the dimensions of the second compartment 13. If a user attempts to overfill the compartment with water, then excess water will drain from the compartment via the bore 28b in the plug.

Figure 6A:
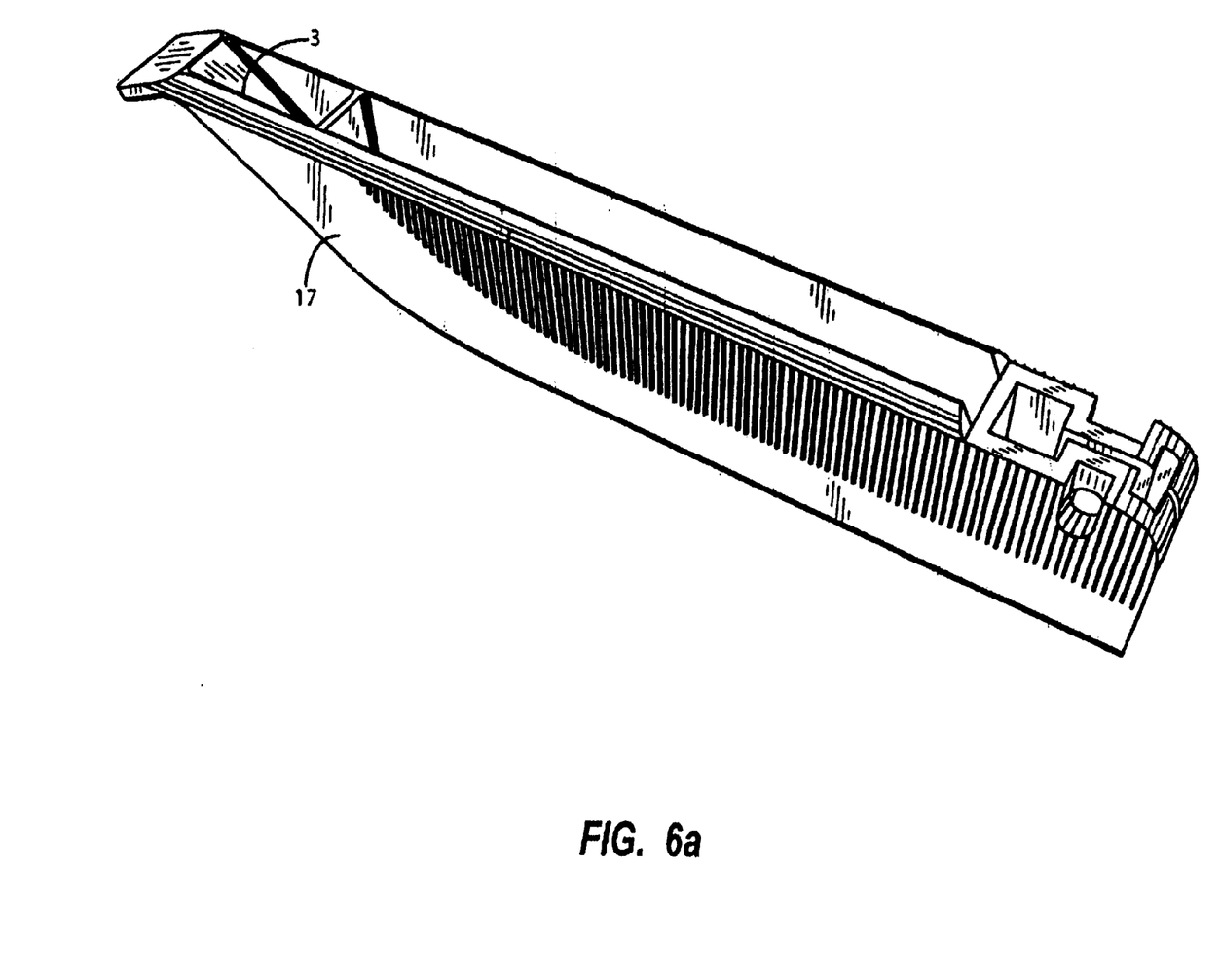
FIGS. 6A and 6B are schematic representations of the wheel guard.
Figure 6B:
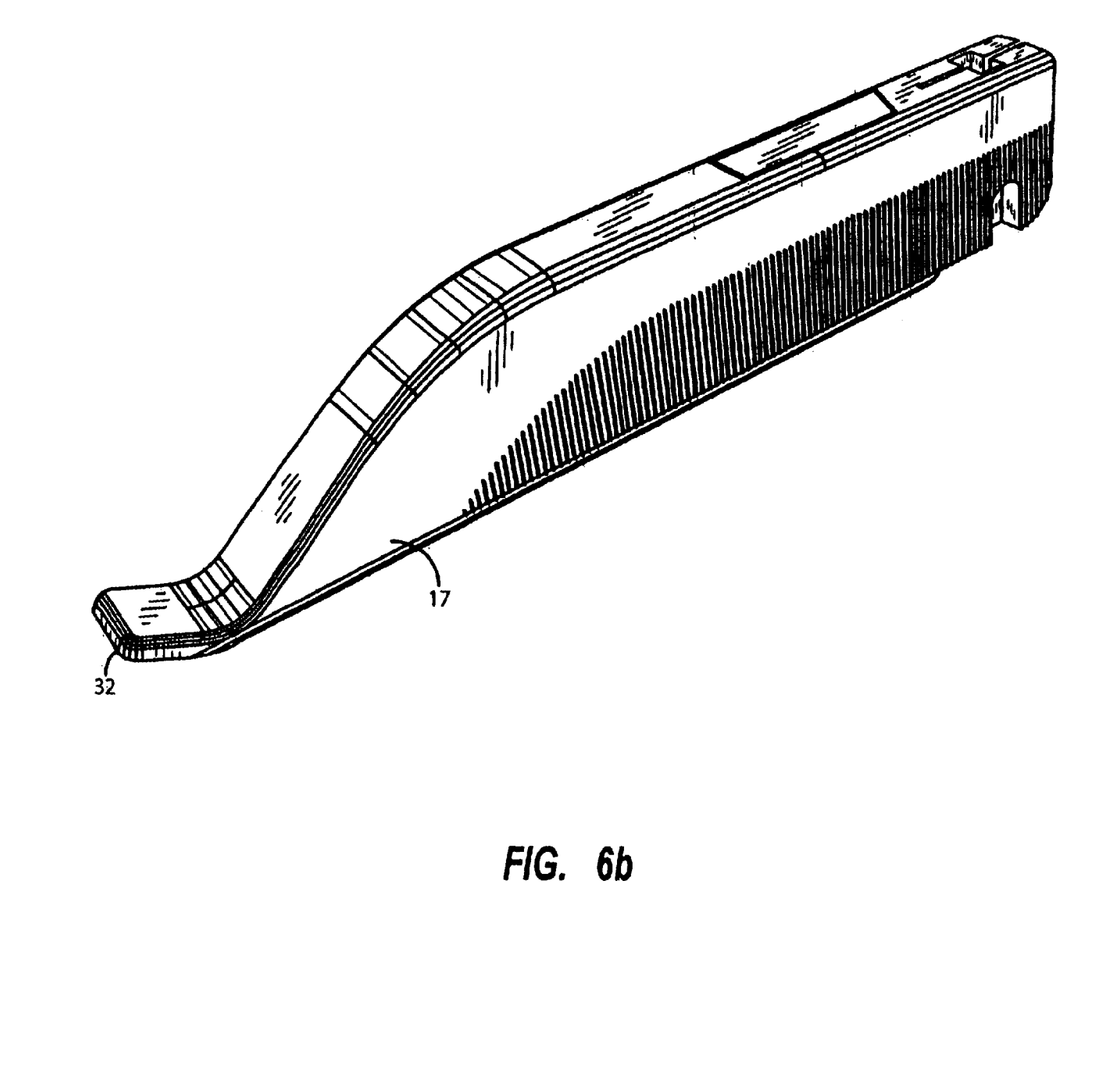
Figure 7:
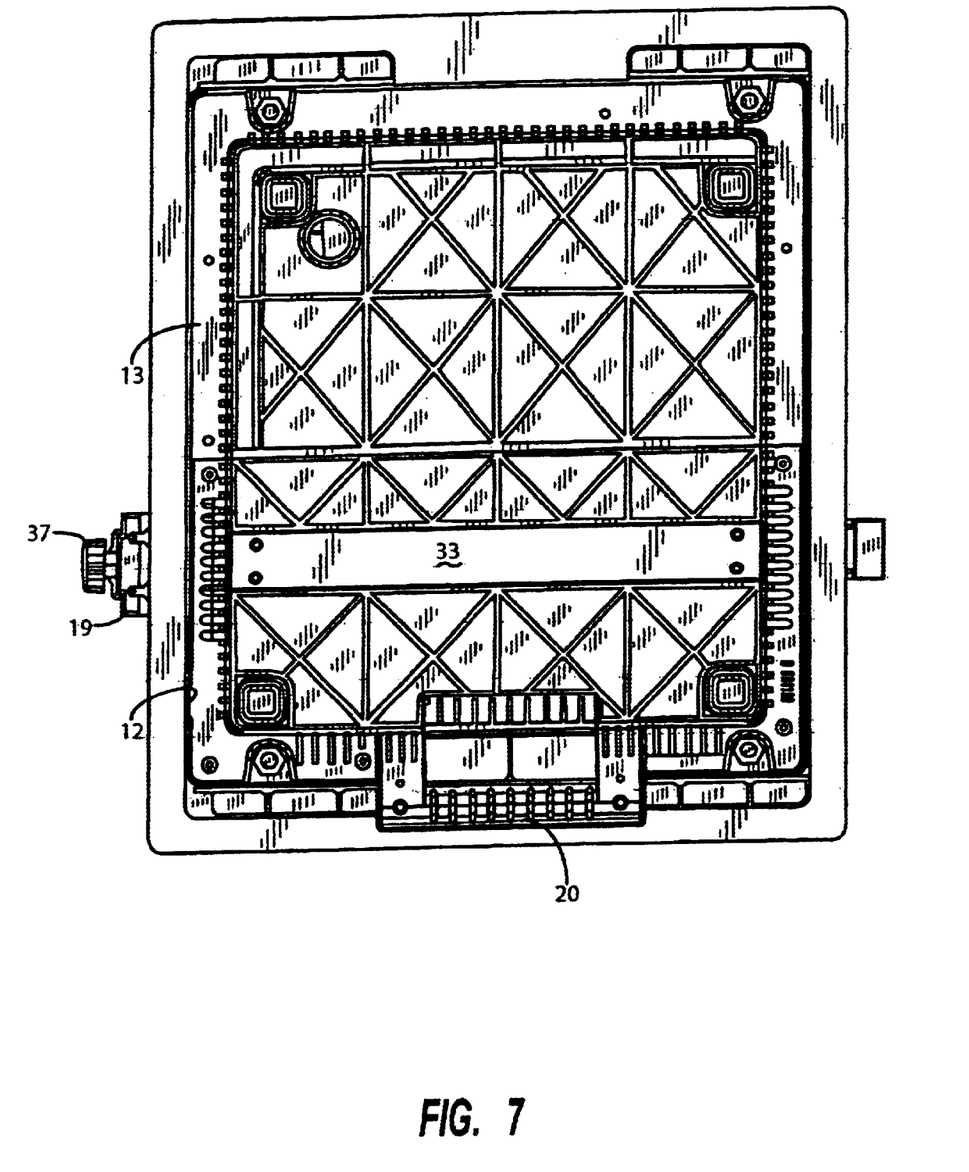
FIG. 7 is a schematic representation showing the underside of the tile cutter of FIG. 1.

Referring now to FIGS. 6A and 6B, the wheel guard 17 is shown in more detail. The guard 17 comprises a portion 31 in which the elongate member is positionable. The guard has an end 32 which is slightly upturned in order to allow easy insertion of a tile into the guard in order to make contact with the wheel.

Figure 8:
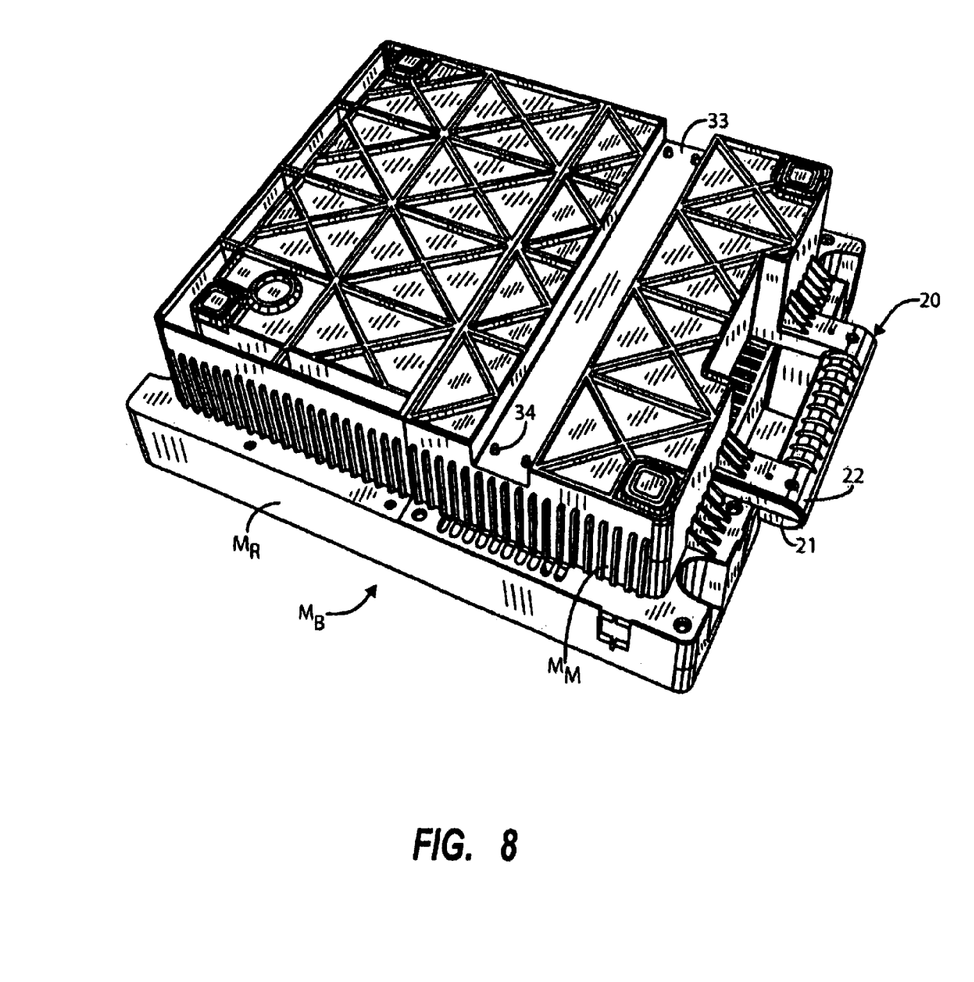
FIG. 8 is a schematic representation showing the underside of the tile cutter of FIG. 1 with the worktop removed.

As shown more clearly in FIG. 8, the first compartment is formed with a channel 33 which channel comprises studs 34. The purpose of the channel 33 will be described in more detail hereinbelow.

Referring now to FIG. 9, the motor 29 is shown in more detail.

Figure 10:
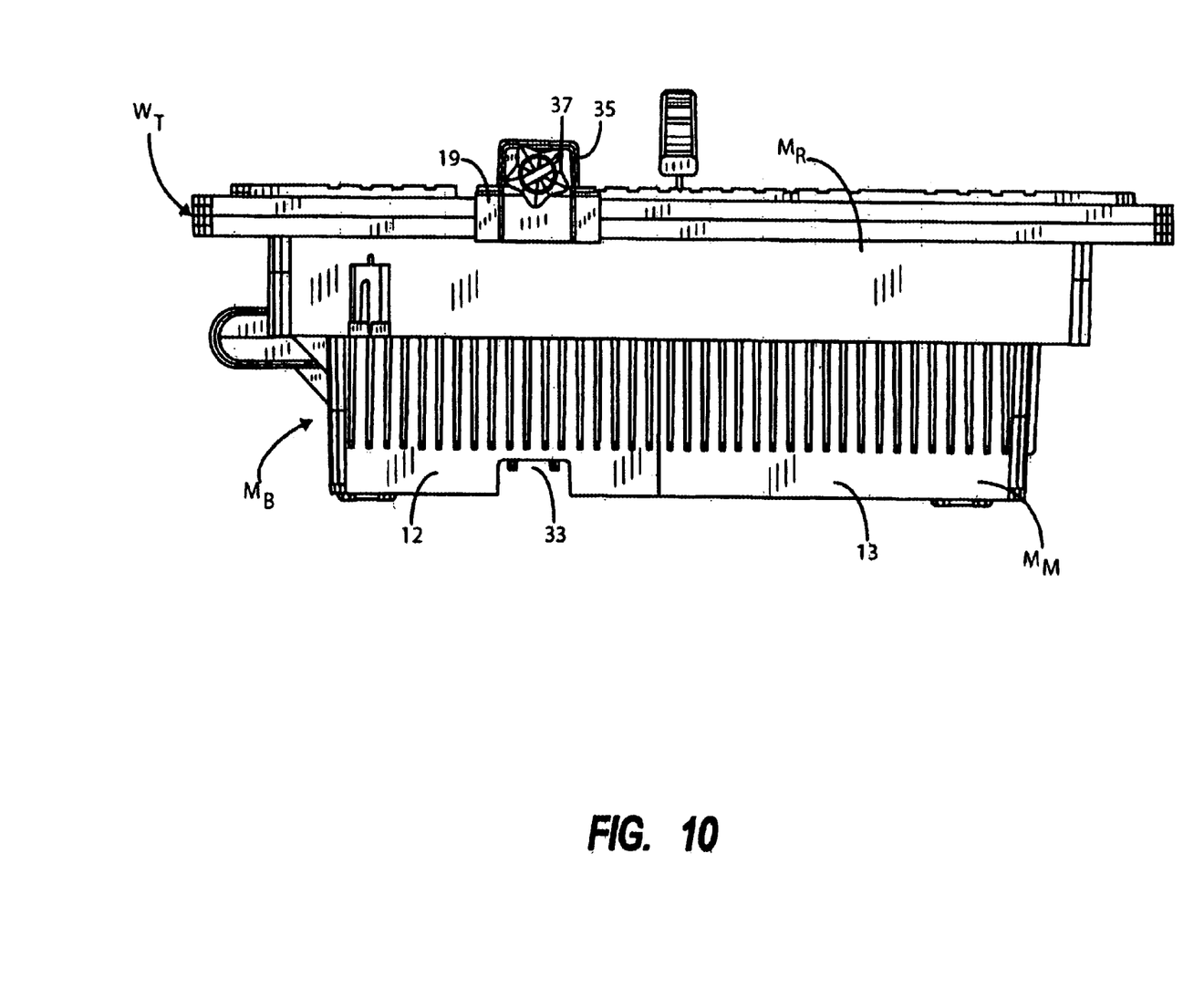
FIG. 10 is a side view of the tile cutter of FIG. 1 showing the guide member and channel in position to enable stacking of tile cutters.
Figure 11:
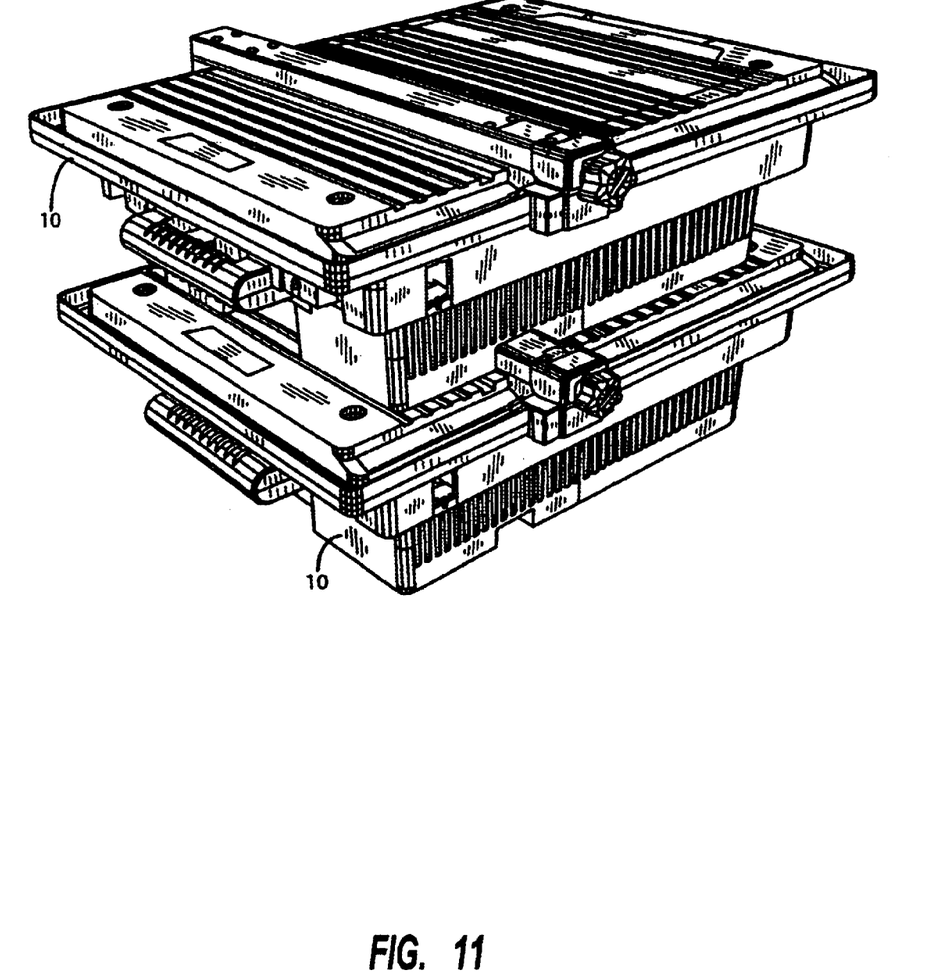
FIG. 11 is a schematic representation showing two tile cutters in a stacked position.
Figure 12:
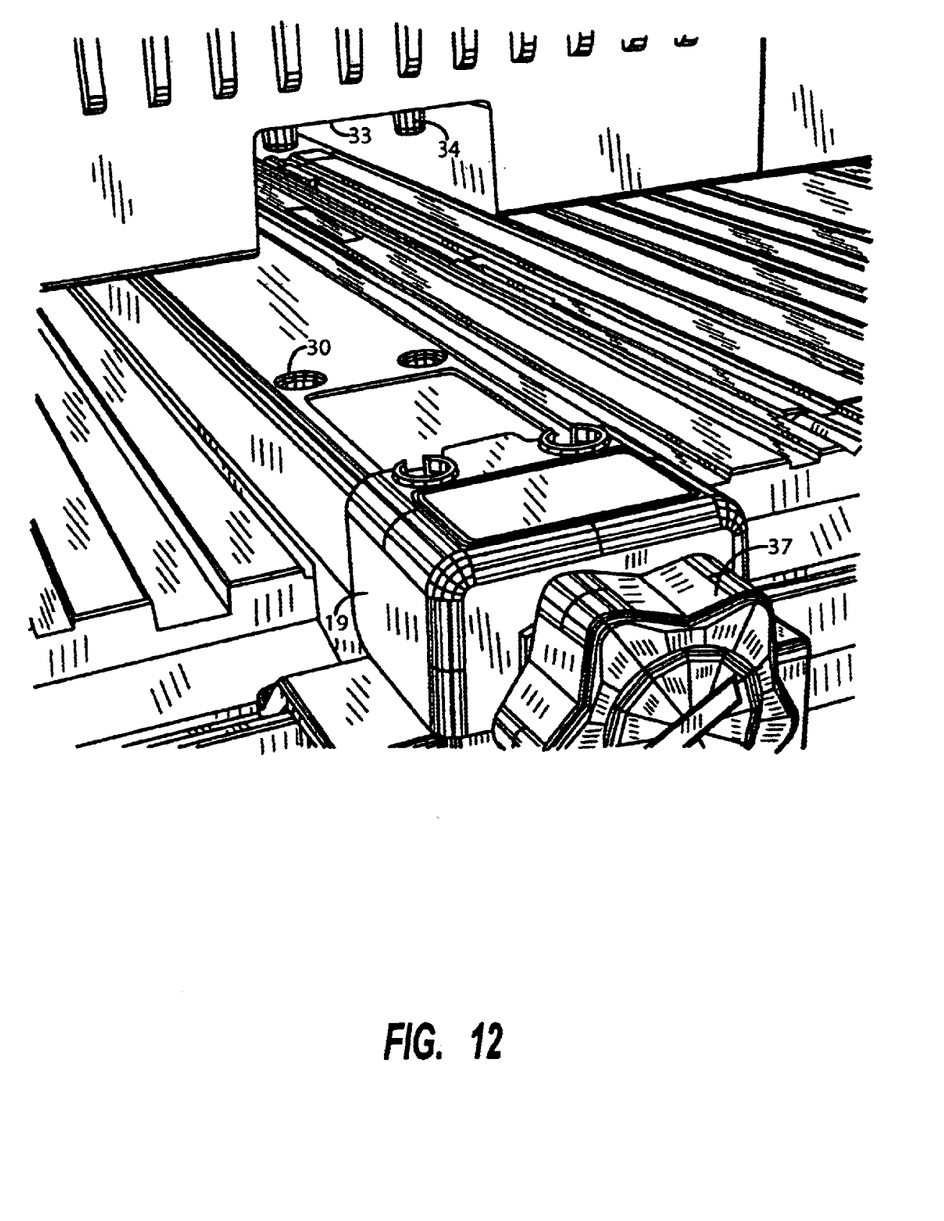
FIG. 12 is a detail of the tile cutters of FIG. 11 showing how the channel of the first tile cutter is secured to the guide member of the second tile cutter.

Referring now to FIGS. 10 to 12, the channel 33 and the guide member 19 are described in more detail.

The channel 33 is formed such that its dimensions are substantially the same as the dimensions of the bar 35 forming the guide member 19. When it is required to stack several file cutters for example at a wholesale or retail outlet, the guide member 19 is moved and positioned so that it is directly above the channel 33. It is then clamped at this position by tightening clamp 36 on to the housing 11 using knob 37. If it is required to stack a second file cutter 10 on the first file cutter then the channel 33 of the second file cutter will engage with the bar 35 on the guide member of the first channel cutter to enable two tile cutters to be stacked as shown in FIG. 11. A column of several tile cutters may be formed in this way.

Referring to FIG. 12, it can be seen that the studs 34 are received within apertures 30 to ensure a stable stacking of the tile cutters 10. However, when it is required to removed one file cutter from a second file cutter it is necessary merely to lift the first tile cutter away from the second tile cutter.

What is claimed is:

1. A tile cutter comprising:
   (a) a cutting wheel;
   (b) a motor which drives the wheel in use;
   (c) a main housing body and a worktop mounted on the main housing body to define a cutting surface upon which tiles may be supported when being cut;
   (d) the main housing body comprising a first compartment for housing the motor; and a second compartment for housing the cutting wheel, the second compartment and a portion of the first compartment being formed from a one-piece component to define an open topped water compartment and a sealed top for the first compartment respectively; and
   (e) wherein the worktop has a main body fixedly secured to the main housing body and has an access opening closed by a movable access lid overlying the second compartment to close the open top of the water compartment, the access lid being hingedly attached to the main body of the worktop to enable the lid to be hingedly moved about a hinge axis parallel to the plane of the cutting wheel to provide access to the water compartment, a support being provided to maintain the access lid at a desired angle relative to the cutting wheel such that the lid defines a mitre guide to enable a mitre edge to be cut in a tile, the worktop further including one or more open topped drainage channels communicating with the cutting surface and the water compartment to permit, in use, water to drain from the cutting surface to the water compartment.

2. A tile cutter according to claim 1 wherein the main body of the worktop is formed from a die cast metal.

3. A tile cutter according to claim 1 wherein the main body of the worktop is formed from an injection molded plastic material.

4. A tile cutter according to claim 1 wherein the water compartment comprises an outlet formed in the base of the second compartment, and the tile cutter further comprises a plug sealingly fittable in the outlet.

5. A tile cutter according to claim 4 wherein the plug comprises an elongate member having a bore extending through the length of the elongate member.

6. A tile cutter according to any one of claims 1–5 further comprising a guide bar extending across the worktop substantially parallel to the plane of the cutting wheel.

7. A tile cutter according to claim 6 wherein the guide bar further comprises a clamping device for clamping the guide bar securely in position on the worktop.

8. A tile cutter according to claim 6 wherein the housing comprises a channel formed in an underside of the housing which channel is shaped to receive a guide member.

9. A tile cutter according to claim 8 wherein the channel comprises one or more studs extending from a first surface of the channel, and a guide member comprises corresponding one or more bores.

10. A tile cutter according to claim 8 wherein said one-piece component defines a first housing component and a second housing component is provided which defines the remainder of the first compartment, the first and second housing components being detachably secured together.

11. A tile cutter according to claim 10 wherein the first and second components are each a one-piece component molded from a plastic material.

12. A tile cutter according to claim 1 comprising a wheel guard positioned over the wheel.

13. A tile cutter according to claim 1 wherein said one-piece component defines a first housing component and a second housing component is provided which defines the remainder of the first compartment, the first and second housing components being detachably secured together.

14. A tile cutter according to claim 13 wherein the first and second components are each a one-piece component molded from a plastic material.

\* \* \* \* \*